(12) United States Patent
Harat et al.

(10) Patent No.: US 10,587,482 B2
(45) Date of Patent: Mar. 10, 2020

(54) DISCOVERY OF IOT DEVICES

(71) Applicant: INTERNATIONAL BUSINESS MACHINES CORPORATION, Armonk, NY (US)

(72) Inventors: Szymon Harat, Cracow (PL); Michal Malczewski, Gliwice (PL); Artur Szczotka, Bielsko-Biała (PL); Eric M. Anderson, Friendswood, TX (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/706,832

(22) Filed: Sep. 18, 2017

(65) Prior Publication Data
US 2019/0089603 A1 Mar. 21, 2019

(51) Int. Cl.
*G06F 15/16* (2006.01)
*H04L 12/24* (2006.01)
(Continued)

(52) U.S. Cl.
CPC .......... *H04L 41/5058* (2013.01); *H04L 41/12* (2013.01); *H04L 67/12* (2013.01); *H04L 67/16* (2013.01); *H04L 67/28* (2013.01); *H04L 67/2819* (2013.01); *H04L 67/34* (2013.01); *H04L 69/18* (2013.01); *H04W 4/38* (2018.02); *H04W 4/50* (2018.02); *H04W 4/70* (2018.02);
(Continued)

(58) Field of Classification Search
CPC ...... H04L 41/5058; H04L 67/34; H04L 67/28
See application file for complete search history.

(56) References Cited

U.S. PATENT DOCUMENTS 9,848,380 B1 * 12/2017 Ekambaram ...... H04W 52/0209
9,860,677 B1 * 1/2018 Agerstam ............... H04L 67/28
(Continued)

FOREIGN PATENT DOCUMENTS

WO 2016080558 A1 5/2016

OTHER PUBLICATIONS http://www.gartner.com/newsroom/id/2839717, Newsroom Press Release, "Gartner Says a Typical Family Home Could Contain More Thank 500 Smart Devices by 2022", Sep. 8, 2014, pp. 1-4.
(Continued)

*Primary Examiner* — Douglas B Blair
(74) *Attorney, Agent, or Firm* — Reza Sarbakhsh

(57) ABSTRACT

Connecting an IoT device enabling a new function of another IoT device. An IoT hub scans a network segment for presence of an IoT device. Upon detecting the IoT device, a device response pattern is received. The device response pattern is compared with stored response patterns. A matching stored response pattern is selected which has a similarity to the device response pattern. A pattern difference is derived. Related device information is transformed into a device signature for the IoT device. The device signature is transferred to a discovery engine. The device signature is compared to stored signatures and protocol information. A matching stored signature and protocol information is transferred to the IoT hub. The IoT hub compares the new function with functions of other connected IoT devices. Upon finding a matching other IoT device, the other IoT device is offered a usage of the new function and protocol information.

20 Claims, 6 Drawing Sheets

(51) Int. Cl.
  *H04W 72/04* (2009.01)
  *H04L 29/08* (2006.01)
  *H04W 76/10* (2018.01)
  *H04W 4/38* (2018.01)
  *H04W 4/70* (2018.01)
  *H04L 29/06* (2006.01)
  *H04W 4/50* (2018.01)

(52) U.S. Cl.
  CPC ......... *H04W 72/048* (2013.01); *H04W 76/10* (2018.02)

(56) References Cited

U.S. PATENT DOCUMENTS

| | | | |
|---|---|---|---|
| 9,867,112 | B1 | 1/2018 | Schwengler et al. |
| 10,291,477 | B1 | 5/2019 | Askar |
| 10,310,832 | B2* | 6/2019 | Hussein .................... G06F 8/61 |
| 2014/0351800 | A1 | 11/2014 | Jao et al. |
| 2016/0041534 | A1* | 2/2016 | Gupta ................. G05B 13/0265 700/275 |
| 2016/0135241 | A1 | 5/2016 | Gujral et al. |
| 2016/0261465 | A1* | 9/2016 | Gupta ................. H04L 12/2816 |
| 2017/0005874 | A1 | 1/2017 | Banerjee et al. |
| 2017/0006595 | A1 | 1/2017 | Zakaria et al. |
| 2017/0053015 | A1* | 2/2017 | Liongosari ............ G06F 16/285 |
| 2017/0126834 | A1* | 5/2017 | Fransen ................ H04L 67/303 |
| 2017/0353859 | A1* | 12/2017 | Idnani .................... H04W 12/08 |
| 2017/0374490 | A1* | 12/2017 | Schoppmeier ......... H04L 67/12 |
| 2018/0091506 | A1* | 3/2018 | Chow ................. H04L 67/2838 |
| 2018/0239316 | A1* | 8/2018 | Toscano .................... G06F 8/38 |
| 2018/0314958 | A1* | 11/2018 | Sethi ..................... G06N 20/00 |
| 2018/0357078 | A1* | 12/2018 | Ando ..................... G06N 99/00 |
| 2019/0034380 | A1* | 1/2019 | Freitas .................... G06F 15/16 |
| 2019/0044818 | A1 | 2/2019 | Nolan et al. |
| 2019/0058697 | A1* | 2/2019 | Chang ................. H04L 63/0428 |
| 2019/0138318 | A1* | 5/2019 | Yang .................... H04L 41/0806 |
| 2019/0173755 | A1* | 6/2019 | Jadhav ................ H04L 12/4625 |
| 2019/0182333 | A1* | 6/2019 | Bartfai-Walcott .... H04L 67/125 |

OTHER PUBLICATIONS

Open Interconnect Consortium, "Introduction of OIC Standard", Standard Working Group Open Interconnect Consortium, Jan. 2016, pp. 1-85.

IBM: List of IBM Patents or Patent Applications Treated As Related (Appendix P), dated Sep. 26, 2019, pp. 1-2.

Pending U.S. Appl. No. 16/583,771, filed on Sep. 26, 2019, entitled: "Discovery of IOT Devices", 39 pages.

Pending U.S. Appl. No. 16/583,796, filed on Sep. 26, 2019, entitled: "Discovery of IOT Devices", 38 pages.

* cited by examiner

DISCOVERY OF IOT DEVICES

FIELD OF THE INVENTION

The invention relates generally to connecting an IoT device to an IoT hub, and more specifically, to enabling a new function of another IoT device.

SUMMARY

According to one aspect of the present invention, a method for connecting an IoT device enabling a new function of another IoT device is disclosed. The method comprises scanning, by an IoT hub, a network segment for a presence of an IoT device—in particular a new and/or unknown IoT device—and receiving, upon detecting the IoT device, a device response pattern, comparing the device response pattern with stored response patterns, selecting a matching stored response pattern which has a predetermined similarity to the device response pattern, and deriving, upon identifying a pattern difference between the device response pattern and the matching stored response pattern, therefrom a new function of the IoT device.

The related device information is transformed into a device signature of the IoT device and transferred to a discovery engine. There it is compared to stored signatures and protocol information. The method may also comprise transferring, upon finding a matching stored signature, the protocol information to the IoT hub, and comparing, by the IoT hub, the new function with functions of other IoT devices connected to the IoT hub. Upon finding a matching other IoT device, the method may comprise offering to the other IoT device connecting to the discovered IoT device a usage of the new function and the protocol information.

According to another aspect of the present invention, a system for connecting an IoT device enabling a new function of another IoT device is provided. The system comprises an IoT hub adapted for performing a plurality of actions: scanning a network segment for a presence of an IoT device, receiving, upon detecting the IoT device, a device response pattern, comparing the device response pattern with stored response patterns, selecting a matching stored response patterns which has a predetermined similarity to the device response pattern, deriving, upon identifying a pattern difference between the device response pattern and the matching stored response pattern, therefrom a new function of the IoT device, and transforming related device information into a device signature of the IoT device.

The system may also comprise a discovery engine, adapted for another set of activities: receiving the device signature from the IoT hub, comparing the received transferred device signature to stored signatures and protocol information, and transferring, upon finding a matching stored signature, the protocol information to the IoT hub.

The IoT hub may also be adapted for comparing the new function with functions of other IoT devices connected to the IoT hub, and upon finding a matching other IoT device, offering to the other IoT device connecting to the discovered IoT device a usage of the new function and the protocol information.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium is any apparatus that may contain means for storing, communicating, propagating or transporting the program for use, by or in a connection with the instruction execution system, apparatus, or device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Preferred embodiments of the invention will be described, by way of example only, and with reference to the following drawings.

DETAILED DESCRIPTION

Figure 1:
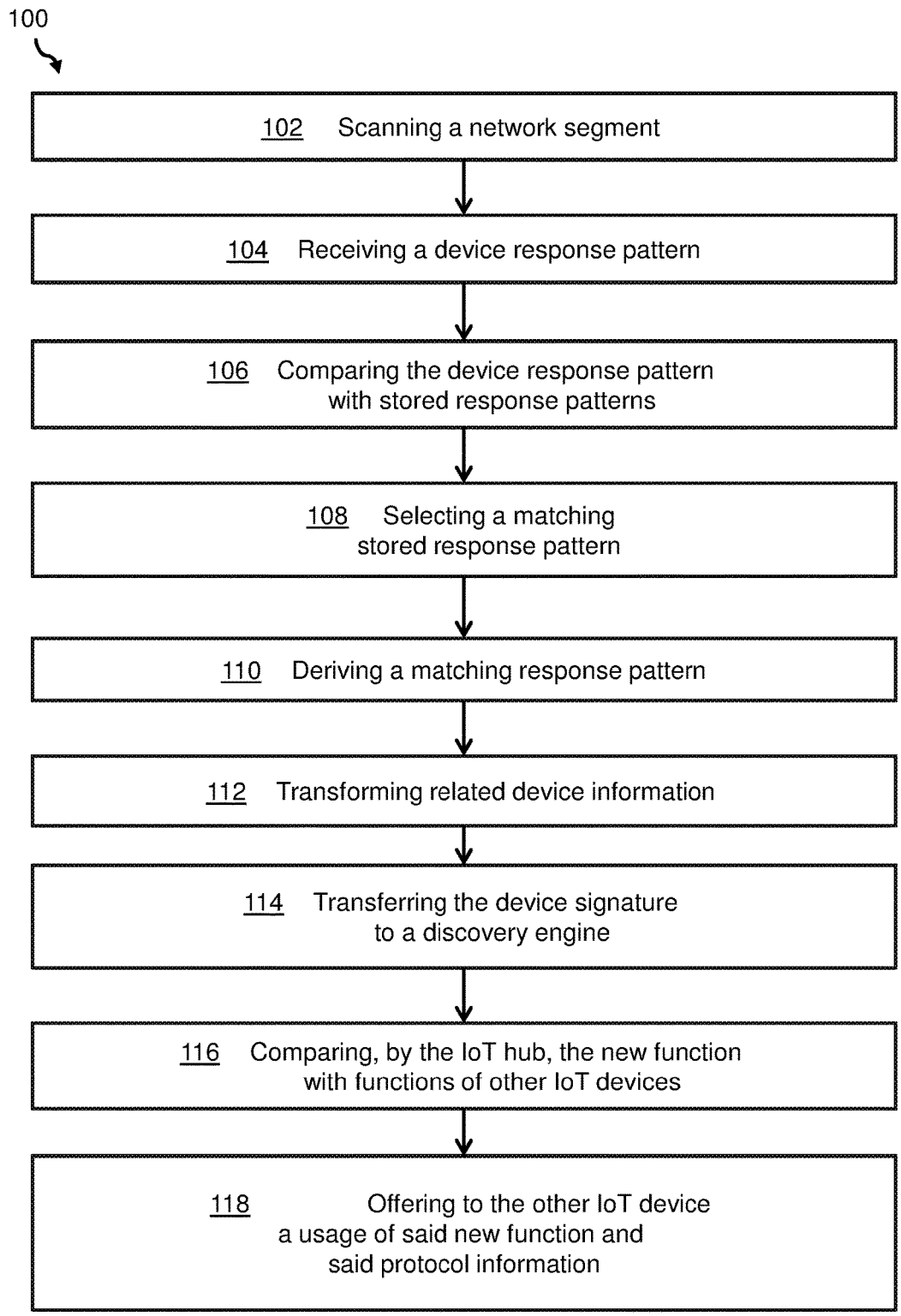
FIG. 1 shows a block diagram of an embodiment of the inventive method for connecting an IoT device enabling a new function of another IoT device.

Currently, the world is experiencing a dramatic rise in the number of IoT (Internet of Things) devices used in industrial and private environments. The work environment, the home environment, a public building, city street equipment (e.g., illumination), etc. are increasingly equipped with devices which are able to connect to each other and perform specific functions. These devices often double portions of their functions as they are usually designed and produced from different companies but, address similar problems—e.g., smart building IoT devices. Thus, a plurality of different devices of different vendors may perform comparable tasks which may create a problem, but may also present an advantage because of having redundant and more reliable information available. If too many of those devices operate in the same ecosystem, however, a network overload may be the result.

Additionally, the devices may not be able to communicate with each other, are not able to interpret the individually used protocols, are not informed about other devices functions and thus, are not able to collaborate. From industry studies it is known that a typical home may comprise more than 500 such devices by the year 2022. Many of those devices may be from different vendors which may dramatically increase the problem of non-collaboration of the IoT devices. A comparable problem of larger scale may arise if such incompatible IoT devices may be operated in industrial, e.g., manufacturing environments, and if those devices generate conflicting results of environmental parameters.

In the context of this description, the following conventions, terms and/or expressions may be used:

The term 'Internet of Things' (IoT) may denote the inter-networking of physical devices, vehicles (also referred to as "connected devices" and "smart devices"), buildings, and other items embedded with electronics, software, sensors, or actuators, and network connectivity which may enable these objects to collect and exchange data. The IoT allows objects to be sensed or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, also encompassing technologies such as smart grids, virtual power plants, smart homes, intelligent transportation and smart cities. Each thing may be uniquely identifiable through its embedded computing system, but is able to interoperate within the existing Internet infrastructure.

The term 'IoT device' as used herein may denote a standard or non-standardized computing device of sensing or measuring environmental parameters of any kind for transferring the measured parameter values via a network to a server. Data is collected and/or exchanged. The group of IoT devices may also comprise actuators or other devices.

The term 'IoT hub' may denote a server acting as communication concentrator and potentially as data harmonizing and preprocessing computing device for a plurality of IoT devices in a predefined physical or logical environment, e.g., a network segment.

The term 'network segment' may denote a local or contained virtual network—wireless or wire-based—for a specific physical or logical sub-segment of a network. The network segment may be delimited to an apartment, a private home, to the inside of a vehicle, to a manufacturing machine, to a production facility or other large industrial buildings (e.g., a warehouse), to a plurality of buildings managed by one facility management company, a public building, any public space, and so on. The network segment may be limited by physical and/or logical boundaries.

The term 'device response pattern' may denote a set of data sent by an IoT device if triggered by the IoT hub. The device response pattern may at least comprise a device identifier (ID) and a plurality of data describing capabilities—i.e., characteristics—of the IoT device. These capabilities may be expressed in a plurality of attributes.

The term 'predetermined similarity' may denote a degree of identity, e.g., expressed in a percentage of identical attributes and/or attribute values between two IoT devices. Different attributes in such a comparison may have different weights.

The term 'new function' may denote a function of an IoT device—typically expressed as one or more parameters—which may not have been detected by the IoT hub by the same, or another IoT device connected to the specific IoT hub.

The term 'layer 2 of the IP network protocol' as used herein may denote the second layer of the four layers of the TCP/IP communication framework, namely, the link layer (layer 1), the Internet layer (layer 2, comprising IP header and IP data), the transport layer (layer 3) and the application layer (layer 4).

The term 'Open Interconnects Consortium Core Framework' may denote a technical framework defined by the Open Connectivity Foundation (OCF) which is an industry group whose stated mission is to develop specification standards, promote a set of interoperability guidelines, and provide a certification program for devices involved in the Internet of Things (IoT). It is one of the biggest industrial connectivity standards organizations for IoT; the OCF members including some of the largest information technology companies. Currently, there are more than 300 member companies. The OCF realizes the Internet of Things also called Network of Everything. The IoT requires easy discovery, and trusted and reliable connectivity between things. The OCF delivers a framework that enables those requirements via a specification, a reference implementation and a certification program.

The term 'IoT device type' may refer to an IoT device class grouping a plurality of different implementations of IoT devices. The classes may be defined according to defined attributes. One classification scheme may comprise sensors and transducers not being enabled to communicate directly to a computing server. However they may need to use a gateway to communicate to a computing server. Devices of other classes may be enabled to communicate directly to a computing server. Another type of class may be related to the capabilities of a specific IoT device, e.g., measuring environmental parameters (e.g., temperature, humidity, wind speed, etc.), acting on a thermostat or vent, controlling a speed of a vehicle, measuring the distance, and delivering video streams or still images, just to name a few.

The term 'virtual IoT device' may denote a combination of capabilities, functions and/or characteristics not integrated into one physical device, but existing as a combination of features, capabilities, functions and/or characteristics of at least two IoT devices. A simple example may be a usage of a smart TV screen by an alarm system having no monitor interface. Another example may be the use of an audio interface of a smart phone for programming an oven in the kitchen.

The proposed method for connecting an IoT device enabling a new function of another IoT device may offer multiple advantages and technical effects:

It may overcoming of known issues with the proliferation of different or similar IoT devices from different vendors implemented more or less everywhere—i.e., in private, industrial and/or public environments. It has become more and more difficult to distribute and manage centrally each and every device type, device capability and device protocol used of the exploding number of IoT devices. The proposed solution takes a combination of a ground up approach with a top-down approach. Thus, a service learning IoT environment may be created. Each time an IoT hub may detect a new IoT device in its environment—i.e., network segment—the capabilities, functions, device responses, attributes, etc. may be compared to known IoT devices—i.e., IoT device response patterns—and may be transferred to a centralized IoT discovery engine. The IoT discovery engine may constantly be engaged in collecting information about new or updated IoT devices from a plurality of different sources (basically from information available on the Internet). The IoT discovery engine may be instrumental in supporting a local IoT hub in enabling the local IoT hub to deal with the exploding number of IoT devices detected in its network segment.

Thus, no manual set up procedures and protocol definitions may be required. This may be especially advantageous for uneducated users. It may be required just to position a new IoT device in a network environment—wireless or wire-based—and the rest of the installation procedure will be done by the IoT hub automatically with support from the IoT discovery engine. In production environments this may reduce the required device management efforts.

In addition, new capabilities—i.e., functions of a new IoT device—may be made available to already existing IoT devices. This may increase the functions of already existing IoT devices in a network segment by defining virtual IoT devices. Thus, made investments in already installed IoT devices may be protected and leveraged through the use of additional functions provided by new IoT devices installed in the same network segment.

Furthermore, the proposed method and system may allow that new functions and other data may be shared across the hubs and enhance also external cognitive systems. Having discovery data and new functions data collected, the system may also advise as to which IoT device to purchase to enable net new function or enhancement. Additionally, multiple devices, able to run similar functions, allow more efficient devices' power control and failover mechanisms An additional advantage may be a new level of redundancy ensuring continuous availability. Instead of focusing on redundant devices for an always-on infrastructure, the focus may be shifted to redundant functions in different devices.

The newly proposed method and system may also allow an enhanced user experience by providing a seamless, follow-the-user UI (user interface), i.e., choosing the most convenient device for an interaction with user at a given location (e.g., TV in living room, microwave panel in kitchen, audio system in bedroom, etc.).

In the following additional embodiments of the method—which may also be applicable to the related system—are described:

According to one permissive embodiment of the method, the network segment may be a home network, a network of a manufacturing site, an office network, a network of a public building, and a network of a public site, or a logically limited network. Virtually any limitation or boundary may be defined for the network segment. The boundary may be related to a physical boundary, like a building, or a logical boundary defined by the reach of the IoT hub. By means of non-limiting example, a facility management company may define the network according to managed apartments, buildings or according to other sorts of groupings of the managed facilities. Another logically limited network may be limited to a production facility or a hospital, a data center, all logistics elements of a company in a country, a car fleet, etc.

According to one advantageous embodiment of the method, the discovery engine may collect continuously IoT device information. Those device data may be collected via searches on the Internet and/or they may be received directly from IoT device manufacturers having an interest to enable a centralized discovery engine to collaborate with a large plurality of IoT hubs (potentially worldwide). This may release the vendors of new IoT devices from exchanging data about new IoT devices and its functions with a large number of local IoT hubs.

According to one additionally advantageous embodiment of the method, the discovery engine may comprise a cognitive system for extracting ID and attribute data from IoT device specifications. Thus, the discovery engine may not only be able to work with IoT device data received from IoT device vendors in a standardized form, but also extract the required data from data sheets, specifications and potentially also from marketing literature or other forms of description of the IoT device features—e.g., a communication forum, chat contributions and the like—in order to extract the attributes and protocol specifications required to describe the functionality of a specific IoT device. This may release IT (information technology) users and IoT device administrators from manual installation procedures.

According to one preferred embodiment of the method, the protocol information may be based on layer 2 of the IP network protocol wherein a protocol stack, higher than layer 2, adheres to a standardized protocol stack. This may guarantee a minimum set of communication capabilities required for an automatic IoT device detection and communication with the IoT hub and the IoT discovery engine.

According to a further preferred embodiment of the method, the standardized protocol stack may be compliant with the Open Interconnects Consortium Core Framework of the OCF. This may reduce further protocol conversions and may enable an easy detection of a new IoT device together with its functions and capabilities.

According to one permissive embodiment of the method, the device information may comprise an IoT device type—in particular an IoT class, like, e.g., light, an air condition system, a fan, a dishwasher, etc. Further examples may be defined according to e.g., the smart home device types defined by the OCF, and its related defined resource types for other environments.

According to a further advantageous embodiment of the method, a communication between the IoT hub and the discovery engine may be performed via a wide area network—in particular the Internet. Additionally, a communication between the IoT hub and the IoT device may be performed wirelessly and/or wire-based, e.g., using a local area network. The used communication protocol may optionally allow an encryption of the transferred data in order to protect privacy and data security. Additionally, the data exchange between the IoT device and the IoT hub may be incompatible with existing standards.

According to an additionally advantageous embodiment of the method, the IoT device and the other IoT device may exchange messages directly, thereby building a virtual IoT device comprising combined functions of the IoT device and the other IoT device. However, alternatively, the device-to-device communication may also be performed via the IoT hub. In doing so, potentially required format transformations may be performed automatically. Additionally, the IoT hub may also contribute own functions to the newly created virtual IoT device.

In this context, and according to one optional embodiment, the method may comprise generating a new virtual device ID with a new virtual device signature by the IoT hub. This new virtual IoT device may be addressed as one device. This may enhance the capabilities of already existing and installed IoT devices significantly. Thus, a learning IoT device environment may be created such that capabilities of different IoT devices may be shared among them. The management of the virtual IoT device may be the same as for any other physical IoT device.

In the following, a detailed description of the figures will be given. All instructions in the figures are schematic. Firstly, a block diagram of an embodiment of the inventive method for connecting an IoT device enabling a new function of another IoT device is given. Afterwards, further embodiments, as well as embodiments of the system for connecting an IoT device enabling a new function of another IoT device, will be described.

FIG. 1 shows a block diagram of an embodiment of the method 100 for connecting an IoT device enabling a new function of another IoT device. The method comprises scanning, 102, by an IoT hub, a network segment for a presence of an IoT device. To signal its presence, the IoT device can respond to a broadcast message with a specific identifying signal pattern. As already mentioned above, the network segment can be locally limited or virtually limited.

The IoT hub is a local server with computing capabilities, e.g., in a private home, a manufacturing site, a public building, or similar.

The method 100 comprises also, upon detecting the newly added IoT device, receiving, 104, a device response pattern—and e.g., storing it—which may typically be at least a partially standardized response comprising an ID and a plurality of attributes of the IoT device. Additionally, the method 100 comprises comparing, 106, the device response pattern with stored response patterns in the IoT hub, and selecting, 108, a matching stored response pattern which has a predetermined similarity. The predetermined similarity may, e.g., be expressed in a percentage of matching attribute metadata to the device response pattern.

Then, the method 100 comprises deriving, 110, upon identifying a pattern difference between the device response pattern and the matching stored response pattern, therefrom a new function—in particular, a function not known so far—of the IoT device. The new function may be identifiable by the attributes of the new IoT device. Thus, an already existing IotT device may, e.g., have gotten a new function by a software upgrade.

Furthermore, the method 100 comprises transforming, 112, related device information into a device signature which may comprise the IoT device ID (unique identifier) and a plurality of attributes of the IoT device, and transferring, 114, the device signature to a discovery engine. The service of the discovery engine may be available as a cloud-based service in a centralized form.

The method 100 comprises also comparing, 116, the received transferred device signature to stored signatures and protocol information and, transferring, 116, upon finding a matching stored signature, the protocol information back to the IoT hub.

Additionally, the method 100 comprises, as part of the function of the IoT hub, comparing, 116, the new function with functions of other IoT devices connected to the IoT hub. Also this is done based on the related attributes, i.e., functions of the IoT devices.

Last but not least, the method 100 comprises, upon finding a matching other IoT device, offering, 118, to the other IoT device connecting, 120, to the discovered IoT device a usage of the new function and the protocol information. Thereby, the functions of already existing IoT devices may be enhanced and extended (function cross-usage).

Figure 2:
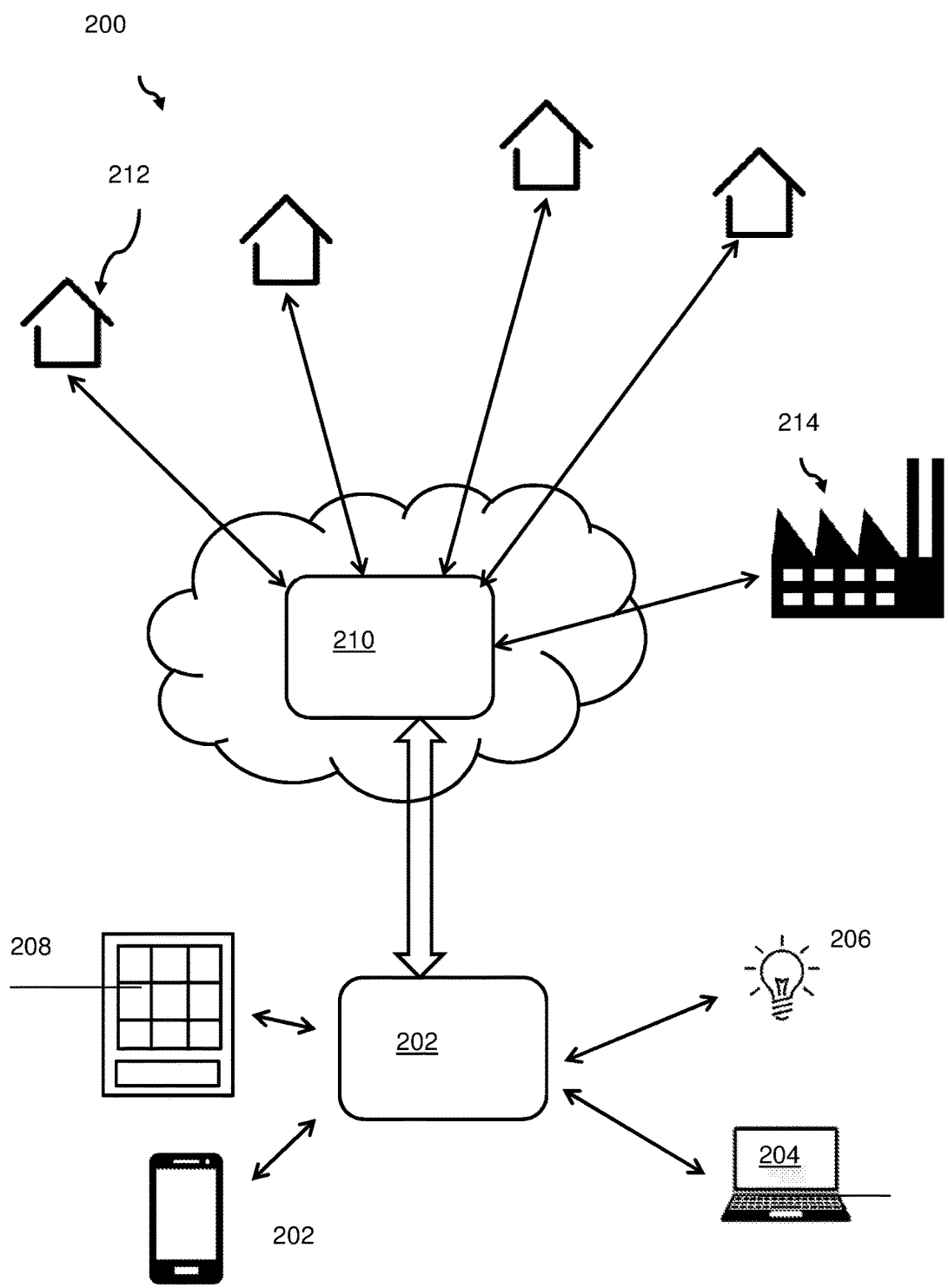
FIG. 2 shows a block diagram of an embodiment of a network topology including the three main components that communicate which each other through the local IoT hub.

FIG. 2 shows a block diagram of an embodiment of a network topology 200 including the three main components that communicate which each other through the local IoT hub 202. The local IoT hub 202 is connected to a plurality of IoT devices; shown examples include a smart light bulb 206, a computer system 204, a smart phone 202 and/or any other devices 208 with IoT functions. The IoT hub 202 discovers any new IoT device in its environment. The devices surrounding the IoT discovery engine 210 are shown as examples of any network segment symbolized by a smart home 212 (only one of the exemplary smart homes has a reference numeral). Alternatively, the network segment for a management by another local IoT hub may be installed in another environment, like a manufacturing facility 214 or any other defined network environment. Any of those local IoT hubs 202 may be in communication contact with the IoT discovery engine 210.

In general, such a system may be described by an IoT discovery system for connecting an IoT device enabling a new function of another IoT device, wherein the system comprises the IoT hub 202 adapted for scanning a network segment for a presence of an IoT device, receiving, upon detecting the IoT device, a device response pattern, comparing the device response pattern with stored response patterns, selecting a matching stored response pattern which has a predetermined similarity to the device response pattern, deriving, upon identifying a pattern difference between the device response pattern and the matching stored response pattern, therefrom a new function of the IoT device, and transforming related device information into a device signature of the IoT device.

A device signature of the IoT device, and the discovery engine 210 adapted for receiving the device signature from the IoT hub, comparing the received transferred device signature to stored signatures and protocol information, and transferring, upon finding a matching stored signature, the protocol information to the IoT hub.

The IoT hub is also adapted for comparing the new function with functions of other IoT devices connected to the IoT hub, and upon finding a matching other IoT device, offering to the other IoT device connecting to the discovered IoT device a usage of the new function and the protocol information.

The local IoT hub 202 resides in the logically or physically separated network segment, e.g., the residents of the local network. It is responsible for communicating with both, the IoT devices, as well as, the IoT discovery engine. When a new IoT device is discovered, the local IoT hub scans the device and collects any and all information about it. For example, the digital signature of a laptop is very different than the digital signal of a connected light bulb. The local IoT hub sends this information to the IoT discovery engine to learn how to communicate with the new device.

The IoT discovery engine may be implemented as a central cloud-based service that represents a repository for all information about IoT-based devices. A new local hub 202 learns about new devices or capabilities of existing devices, and they report back to the discovery engine. As an example, a local hub 202 may discover that a connected refrigerator has a screen that is able of displaying questions to users. This may be a new capability with an API (application programming interface) that is used to access the new screen in the IoT environment. This information is passed to the IoT discovery engine such that other local hubs 202 now understand the new function of their already existing IT devices. In addition, manufacturers can directly supply information about devices they create and ship to customers ensuring the APIs are used appropriately.

The exemplary IoT devices 202, . . . , 208 represent any and all devices that are connected to the local network which may need to communicate with each other. As new devices come online, existing devices might want to take advantage of capabilities of the new devices. When an IoT device needs to call an external function, it asks the local hub 202 which other device can perform that function (e.g., display, audio I/O) and how to communicate with it. For that, the local hub 202 maintains a list of capabilities and API references.

Figure 3:
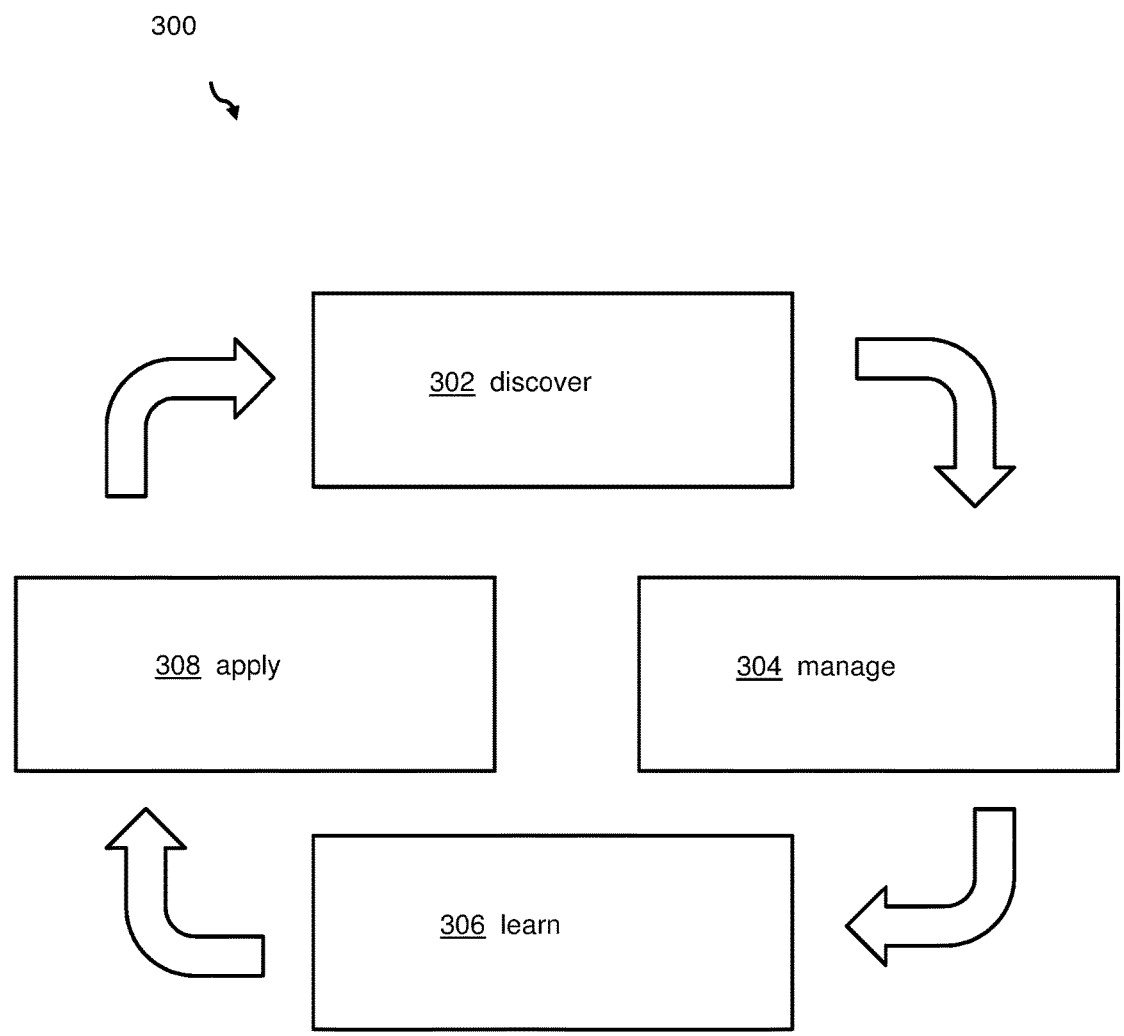
FIG. 3 shows a block diagram of an embodiment of a logical process flow of a system lifecycle maintained by the local IoT hub.

FIG. 3 shows a block diagram of an embodiment of a logical process flow 300 of a system lifecycle maintained by the local IoT hub. In the discovery phase 302, all the IoT devices available in a short (or logical) range—in particular in the local network segment—no matter of the layer 2 access method being used, are discovered. The used protocol may be agnostic to any communication protocol specification. Thus, any device may be detected.

The manage phase 304 is characterized by "configure and manage on behalf of the user." Not any configuration and/or maintenance is required by the end-user. This applies to the installation, upgrade procedures, security and patching, pairing, and so on.

The next phase, the learning phase 306, may be described as the ability to learn about new capabilities of IoT devices working together. New functionalities—in particular those derived from a combination of features and functions of different IoT devices—are announced (by an alert, a message) to the end-user. The end-user may decide to use or decline this new function and the system (the IoT hub) may capture the settings of a related user interface.

In the last portion of the lifecycle, the apply phase 308 is positioned. A new function may be applied by an "accept click" on a user device. The end-user decides whether or not to deploy the new capability or functionality (learned in the step before "learn 306") being offered by the learning process done somewhere else—potentially supported by a cognitive system.

A simple example may illustrate this: It may utilize the smart phone to turn on lights in the house. Today, users must stick to one brand of connected smart light bulbs in order to seamlessly use the manufacturer's application. With a local hub that is able to learn as new devices become available and active, the smart phone may request from the local IoT hub how to turn on the lights and the IoT hub response may comprise five different manufacturers and standards with exactly how to utilize the new smart light bulbs. Even if one of the brands is from a small, previously unknown manufacturer, the smart phone will be able to turn the light on/off, change the hue, set a timer or any other function because the local IoT hub 202 has learned (from the IoT discovery engine) how to operate that device.

Another use case may illustrate the functionality even better. The use case is related to utilize a connected light bulb for a new function, not previously identified by a manufacturer: A light bulb, acting also as an infrared transmitter that can be used to control other IR capable devices, is placed in range of an IR transmitter.

The new IoT enabled light bulb has been installed into a kitchen ceiling lamp. The IoT hub discovers this new IoT device during a routine scan of the network and then tries to identify the device based on known port response patterns. While the IoT hub may realize it is a light bulb (matching a previously known signature); the IoT hub may not determine the fact that the light bulb has an infrared light diode (IRD).

The information about the new device (ID, available ports, connection protocol, version, signature, etc.) is packaged up and sent to a cloud based IoT discovery engine. The discovery engine compares the signature to a database of other signatures, some received from other IoT hubs or others received directly from manufacturers. It may find a match provided by the manufacturer with specifications on how to communicate (APIs available) with the light bulb. One such API is controlling the IR transmitter.

This information is sent back to the local IoT hub. The local IoT hub compares the available functions with other devices to see if a match is found. In the case of IR transmission, it finds that four devices can receive IR communications: television, DVD player, radio and microwave oven. It also knows that there are a number of devices capable of communicating with humans: The devices may include smartphone, computer and a LCD display on the refrigerator.

Each of those devices, can display a message to the end-user such as "This device is now capable of controlling the DVD Player; do you wish to use it as such?". In the here proposed example, the user may decide "NO" for using the refrigerator's LCD because it is not efficient, but using his smartphone to turn on/off the TV set may be seen as a great proposed benefit.

In this example, the IoT hub discovered a new device, learned about its capabilities, and proposed a new way of connecting two devices to perform a functions that neither was designed to do. This can be expanded to many more complicated function and devices as well. This example is generalized in the next figure.

Figure 4:
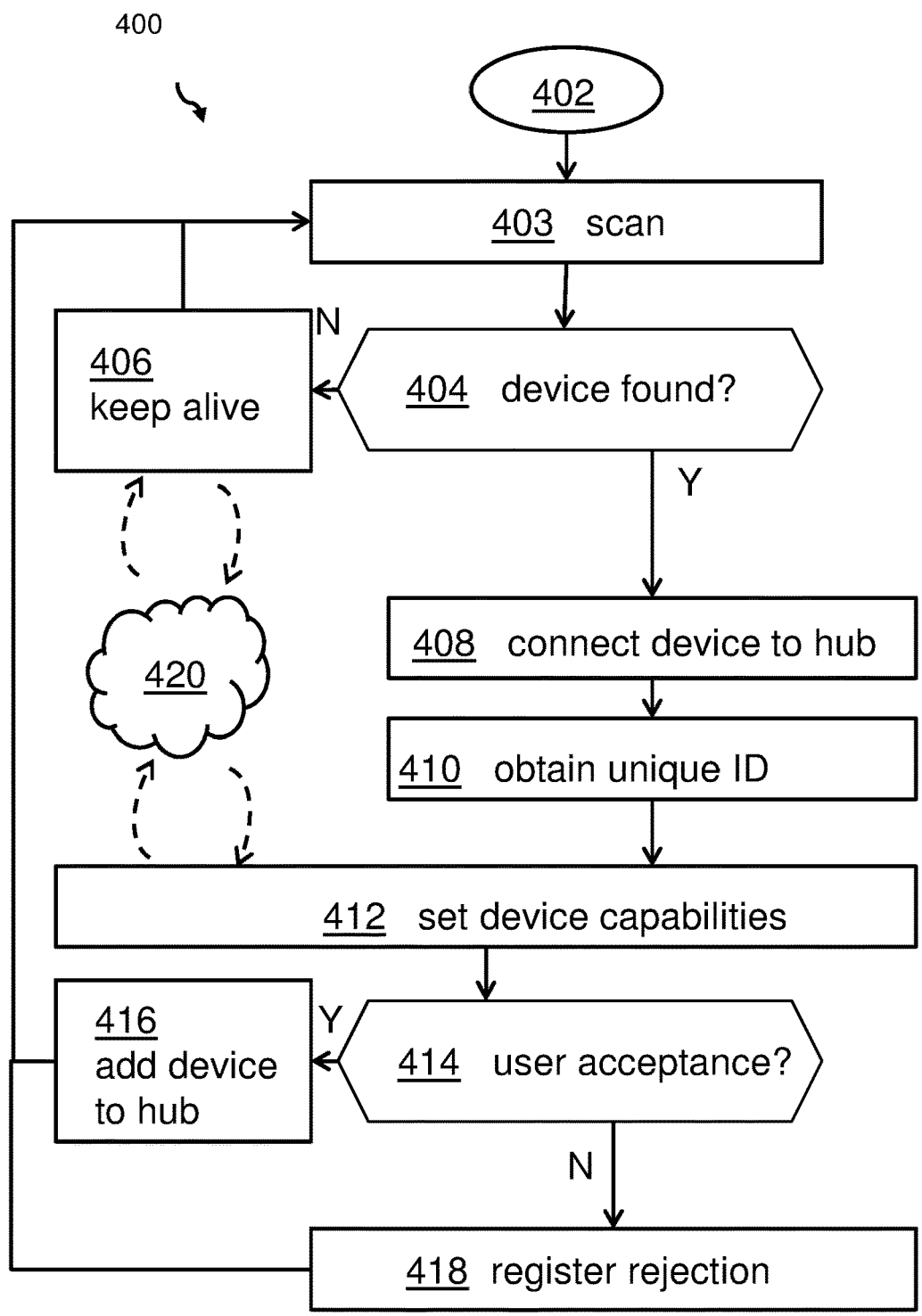
FIG. 4 shows an embodiment of a flowchart detailing the IoT device discovery process.

FIG. 4 shows an embodiment of a flowchart 400 detailing the IoT device discovery process. The process starts at 402 and then scans, 403, the network segment for the devices in the area. Then, it is determined, 404, whether it is a new IoT device. If that is not the case, the existing IoT device is kept alive, 406. If the IoT device is new—case "Y"—the IoT devices logically connect, 408, to the IoT hub and a unique device identifier and a device class—if available—is obtained, 410. Otherwise, a portal signature is determined. Then, 412, the device capabilities and communication methods are determined from a knowledge base in the IoT hub. This is done using an IoT capabilities meta-description data store of the IoT discovery engine by sending a class ID from the IoT hub to the IoT discovery engine. The related information is sent back to the local IoT hub. These last two activities are illustrated by the dashed lines between box 412 and the cloud symbol 420. A comparable communication is done from the IoT hub to the matter descriptions stored, as indicated by the dashed lines between the step 406 "keep alive" and the cloud symbol 420.

If the user accepts the new device capabilities, 414, the new device, including all its functions, is added to the IoT hub, 416. If the user does not accept—case "N"—the user's rejection is registered, 418 and the process returns to the beginning ("403 scan").

It may be noted that in the step of obtaining the unique identifier (localID, classID), the capabilities and metadata communication framework of OCF (mentioned above) may be used.

Figure 5:
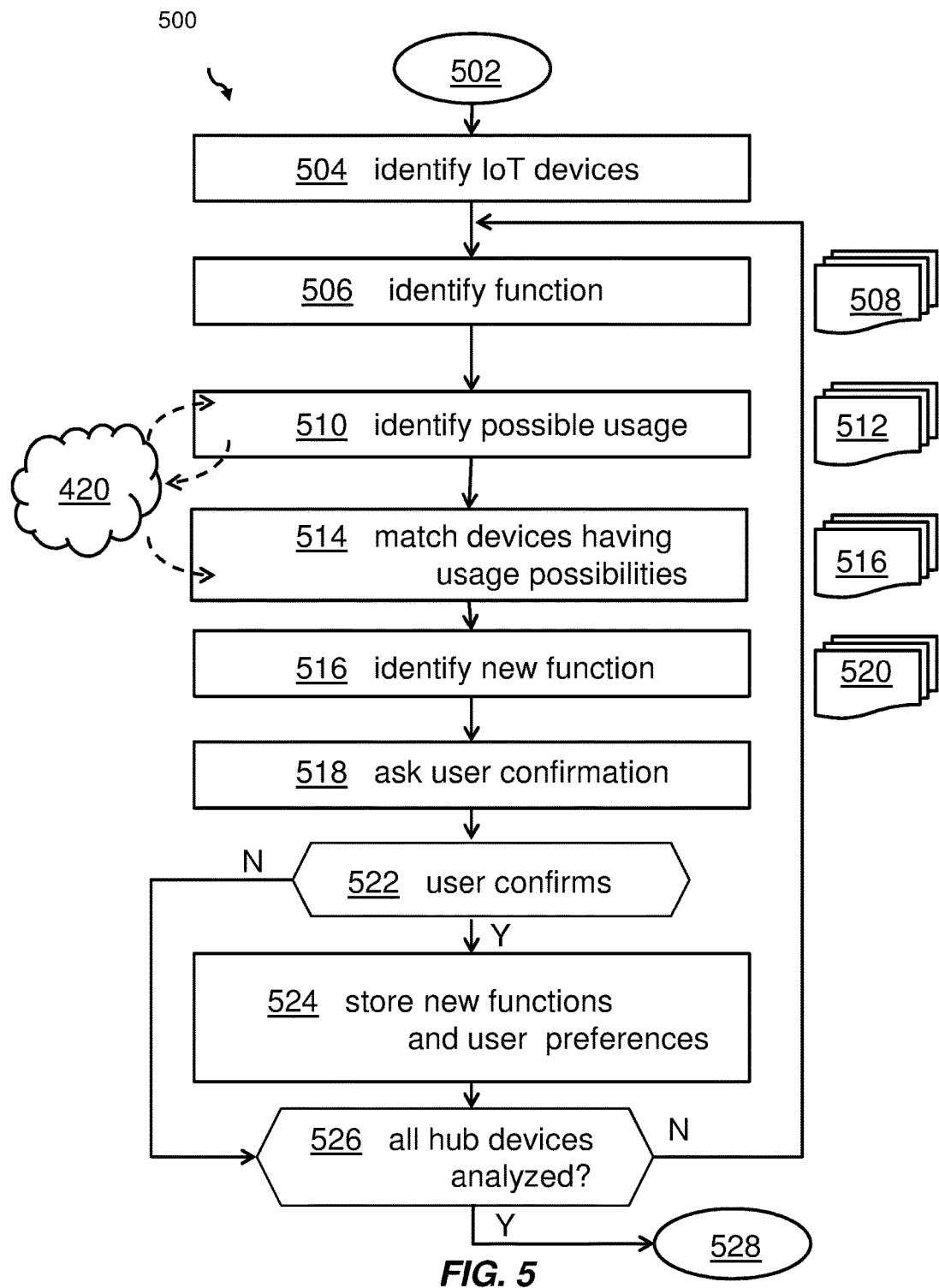
FIG. 5 shows an embodiment of the flowchart and detailing the learning phase for the IoT device.

FIG. 5 shows an embodiment of the flowchart of a process 500 and detailing the learning phase for the IoT device. The process starts at 502. As a first active step, a scanning, 504, of devices in range using known communication protocols available for the IoT hub is performed. The activity is initiated by the IoT hub. The communication can be initialized by a broadcast message from the IoT hub (not shown here). This may, e.g., be the function of opening a window or controlling the temperature, symbolized by 508.

Next, the process 500 identifies a possible usage of the functions, 506. Examples of the device functions for the function "opening a window" may be "1) lower temperature," "2) raise temperature," "3) air ventilation," "4) reduce noise." Examples of the device functions for the function "controlling the temperature" may be "1) lower temperature," "2) raise temperature," "3) change humidity." Together, these options are symbolized by 512.

Then, a matching process step, 514, is performed by looking for matching devices having a useful usage possibility for the new function. Options shown to the user are symbolized by block 516. It may be noted that the steps of identifying a possible usage (block 510) and the step of looking for matching devices having usage possibilities or usage options may be facilitated by a cognitive reasoning support, either locally or by a cloud service 420. The potential data exchange is symbolized by the dashed lines. Thus, the related cognitive reasoning engine proposes the matching devices and the optional usage possibilities.

In a next step, the process 500 identifies, 516, what new functions the IoT hub has. Exemplary, the options "by opening or closing the window one can: (1.) lower the temperature or (2.) rise the temperature." Those options are symbolized by 520.

In a next step 518, the user is asked for a confirmation. If the user agrees—case "Y" of the determination step 522 whether the user confirms—the IoT hub may identify the last used user interface device settings, 524, and the new function(s) is (are) stored in the IoT hub together with the related user preferences. A check, whether all IoT devices have been analyzed, 526, concludes the main loop of this process. In case all devices have been analyzed, the process ends at 528; otherwise the process 500 flow goes back to the step after the step for identifying IoT devices, 504.

Figure 6:
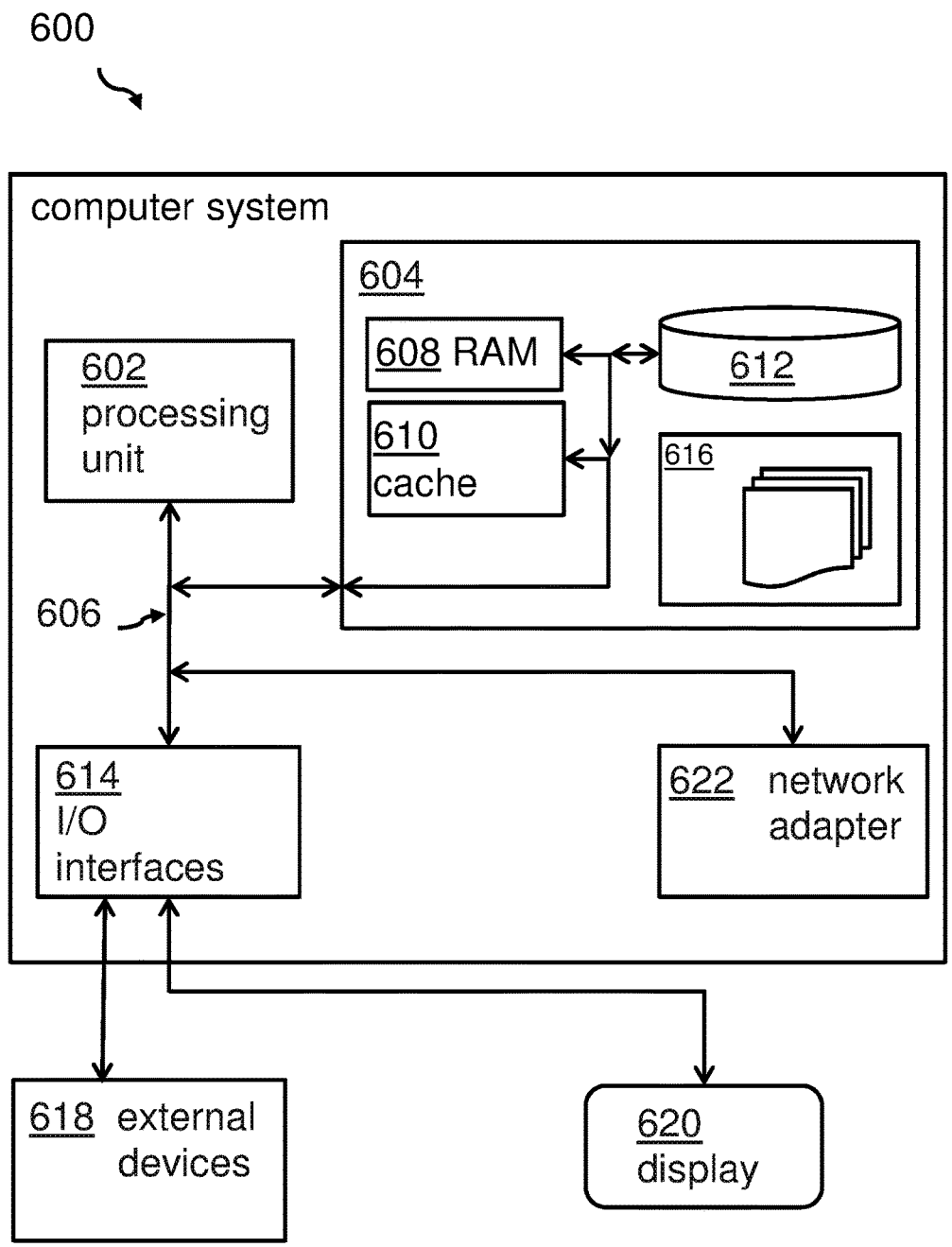
FIG. 6 shows an embodiment of a computing system for implementing one or more partial or complete systems, according to FIG. 2.

Embodiments of the invention may be implemented together with virtually any type of computer, regardless of the platform being suitable for storing and/or executing program code. FIG. 6 shows, as an example, a computing system 600 suitable for executing program code related to the proposed method, either being executed on the IoT hub or the IoT discovery engine.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for connecting an IoT device enabling a new function of another IoT device, said method comprising:
    scanning, by an IoT hub, a network segment for a presence of an IoT device;
    receiving, upon detecting said IoT device, a device response pattern;
    comparing said device response pattern with stored response patterns;
    selecting a matching stored response pattern which has a predetermined similarity to said device response pattern;
    deriving, upon identifying, a pattern difference between said device response pattern and said matching stored response pattern, therefrom a new function of said IoT device;
    transforming related device information into a device signature of said IoT device;
    transferring said device signature to a discovery engine;
    comparing said received transferred device signature to stored signatures and protocol information;
    transferring, upon finding a matching stored signature, said protocol information to said IoT hub;
    comparing, by said IoT hub, said new function with functions of other IoT devices connected to said IoT hub; and
    upon finding a matching other IoT device, offering to said other IoT device connecting to said discovered IoT device a usage of said new function and said protocol information.

2. The method according to claim 1, wherein said network segment is selectively one of the following: a home network, a network of a manufacturing site, an office network, a network of a public building, a network of a public site, a logically limited network, and an internal IT center network.

3. The method according to claim 1, wherein said discovery engine continuously collects IoT device information.

4. The method according to claim 3, wherein said discovery engine comprises a cognitive system for extracting an identifier and attribute data from IoT device specifications.

5. The method according to claim 1, wherein said protocol information is based on layer 2 of said IP network protocol and wherein a protocol stack higher than layer 2 adheres to a standardized protocol stack.

6. The method according to claim 5, wherein said standardized protocol stack is compliant with the Open Interconnects Consortium Core Framework.

7. The method according to claim 1, wherein said device information comprises an IoT device type.

8. The method according to claim 1, wherein:
    a communication between said IoT hub and said discovery engine is performed via a wide area network, and
    wherein a communication between said IoT hub and said IoT device is performed wirelessly and/or wire-based.

9. The method according to claim 1, wherein said IoT device and said other IoT device exchange messages directly, thereby building a virtual IoT device comprising combined functions of said IoT device and said other IoT device.

10. The method according to claim 1, also comprising generating a new virtual device ID with a new virtual device signature by said IoT hub.

11. An IoT discovery system for connecting an IoT device enabling a new function of another IoT device, said system comprising:
    an IoT hub adapted for:
        scanning a network segment for a presence of an IoT device;
        receiving, upon detecting said IoT device, a device response pattern;
        comparing said device response pattern with stored response patterns;
        selecting a matching stored response pattern which has a predetermined similarity to said device response pattern;
        deriving, upon identifying a pattern difference between said device response pattern and said matching stored response pattern, therefrom a new function of said IoT device, and
        transforming related device information into a device signature of said IoT device, a discovery engine adapted for:
    receiving said device signature from said IoT hub;
    comparing said received transferred device signature to stored signatures and protocol information; and
    transferring, upon finding a matching stored signature, said protocol information to said IoT hub,
    wherein said IoT hub is also adapted for comparing said new function with functions of other IoT devices connected to said IoT hub, and upon finding a matching other IoT device, offering to said other IoT device connecting to said discovered IoT device a usage of said new function and said protocol information.

12. The system according to claim 11, wherein said network segment is selectively one of the following: a home network, a network of a manufacturing site, an office network, a network of a public building, a network of a public site, and a logically limited network.

13. The system according to claim 11, wherein said discovery engine is also adapted for continuously collecting IoT device information or said discovery engine comprises a cognitive system for extracting ID and attribute data from IoT device specifications.

14. The system according to claim 11, wherein said protocol information is based on layer 2 of the IP network protocol and wherein a protocol stack, higher than layer 2, adheres to a standardized protocol stack.

15. The system according to claim 14, wherein said standardized protocol stack is compliant with the Open Interconnects Consortium Core Framework.

16. The system according to claim 11, wherein said device information comprises an IoT device type.

17. The system according to claim 11, wherein a communication between said IoT hub and said discovery engine is based on a wide area network, and further wherein a communication link between said IoT hub and said IoT device is based on a wireless network and/or wire-based network.

18. The system according to claim 11, wherein said IoT device and said other IoT device are adapted for exchanging messages directly, thereby building a virtual IoT device comprising combined functions of said IoT device and said other IoT device.

19. The system according to claim 1, wherein said IoT hub is also adapted for generating a new virtual device ID with a new virtual device signature.

20. A computer program product for connecting an IoT device to an IoT hub enabling a new function of another IoT device, said computer program product comprising a computer readable storage medium having program instructions embodied therewith, said program instructions being executable by one or more computing systems to cause said one or more computing systems to:
   scan, by an IoT hub, a network segment for a presence of an IoT device;
   receive, upon detecting said IoT device, a device response pattern;
   compare said device response pattern with stored response patterns;
   select a matching stored response pattern which has a predetermined similarity to said device response pattern;
   derive, upon identifying a pattern difference between said device response pattern and said matching stored response pattern, therefrom a new function of said IoT device;
   transform related device information into a device signature of said IoT device;
   transfer said device signature to a discovery engine;
   compare said received transferred device signature to stored signatures and protocol information;
   transfer, upon finding a matching stored signature, said protocol information to said IoT hub;
   compare, by said IoT hub, said new function with functions of other IoT devices connected to said IoT hub, and
   upon finding a matching other IoT device, offer to said other IoT device connecting to said discovered IoT device a usage of said new function and said protocol information.

* * * * *